United States Patent
Johnson

[15] 3,689,015
[45] Sept. 5, 1972

[54] ADJUSTABLE CABLE RACK AND CONNECTION MEANS THEREFOR

[72] Inventor: Roy E. Johnson, 12308 Aegean St., Norwalk, Calif. 90650

[22] Filed: Dec. 14, 1970

[21] Appl. No.: 97,740

[52] U.S. Cl. ................................. 248/70, 248/288
[51] Int. Cl. ............................. F16l 3/20, F16l 3/22
[58] Field of Search ...... 248/68 R, 70, 73, 74 R, 298, 248/295

[56] References Cited

UNITED STATES PATENTS 1,657,939   1/1928   Rockwell ............... 248/295 X

FOREIGN PATENTS OR APPLICATIONS 56,873   9/1944   Netherlands ............... 248/74
959,109   5/1964   Great Britain ............... 248/73
1,472,658   3/1967   France ......................... 248/68

Primary Examiner—Chancellor E. Harris
Attorney—Lyon & Lyon

[57] ABSTRACT

An adjustable cable rack includes an elongated bracket adapted to support one or more rack arms at various levels and a connector adapted to rigidly secure the bracket to a continuous channel shaped support. The connector has a brace member which prevents pivotal movement of the bracket about the support and screw threaded holding means inter-connecting the brace, bracket and support which permits adjustment of the cable rack.

11 Claims, 4 Drawing Figures

INVENTOR
ROY E. JOHNSON
BY
Lyon & Lyon
ATTORNEYS

ADJUSTABLE CABLE RACK AND CONNECTION MEANS THEREFOR

This invention relates to an adjustable cable rack and more particularly relates to the means for securing the adjustable rack to a continuous channel shaped support.

Cable racks are used to support and position underground electrical cables in pre-cast concrete vaults. Each rack typically includes an elongated vertical support bracket adapted to support one or more arms which extend out from the wall of the vault at various levels.

In the past it had been the practice to bolt each end of the vertical bracket to the wall of the vault. Since several racks are normally required for each vault, the bolting of the brackets was a time consuming operation. Moreover, the bolting of the brackets prevented subsequent lateral adjustment of the racks within the vault without rebolting the brackets at a different location on the wall. Lateral adjustment of the racks is particularly desirable because when cables are spliced it is important that the splice be positioned directly over the rack arm. Therefore, in order to provide for this lateral adjustment of the racks, the more recent practice has been to provide the walls of the pre-cast vaults with horizontally extending support members or so-called "uni-struts" embedded within the walls at various levels. These unit-struts each define a continuous channel to which the end of the bracket is slidably mounted for adjustment purposes.

The provision of uni-struts within the vaults has not however completely solved the problem because frequently the racks are shorter than the distance between the uni-struts and therefore only one end of the bracket support can be secured unless the other end is bolted directly to the concrete wall of the vault. Since the direct bolting to the wall is undesirable, it is customary to secure the upper end of the elongated bracket to the uni-strut and leave the lower end of the bracket unsecured. However, due to expansion and compression of the cable, a considerable amount of torque is created on the bracket at its connected end which will cause the bracket to pivot from its vertical position and if the rack is supporting a spliced cable the splice will be moved off the bracket arm.

Therefore, it is a primary object of this invention to provide a laterally adjustable cable rack for supporting cables which will resist the force of the cable to remain in a fixed position.

Another object of this invention is to provide a cable rack having an elongated bracket member adapted to support one or more rack arms and a connector for securing the bracket at one end to a continuous channel shaped fixed support. In accordance with this object the connector includes brace means to prevent pivotal movement of the bracket around its secured end and locking means to secure the rack to the fixed support at a desired lateral position.

A still further object of this invention is to provide a cable rack which is inexpensive to manufacture, incorporates existing cable rack components, and is simple and easy to operate.

Other and further objects and advantages of this invention will be made readily apparent from the accompanying drawings and the following detailed description.

Figure 4:
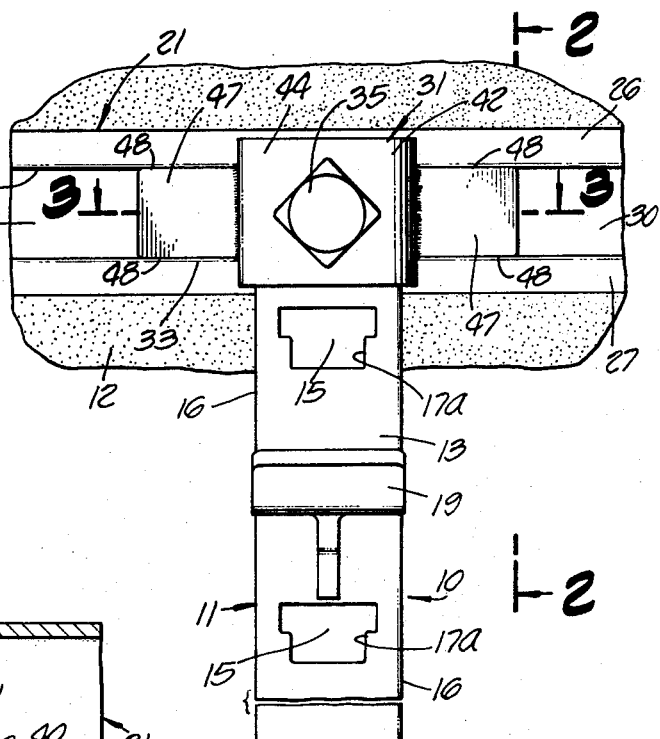
FIG. 4 is a perspective view illustrating the means for preventing pivotal movement of the bracket.
Figure 1:
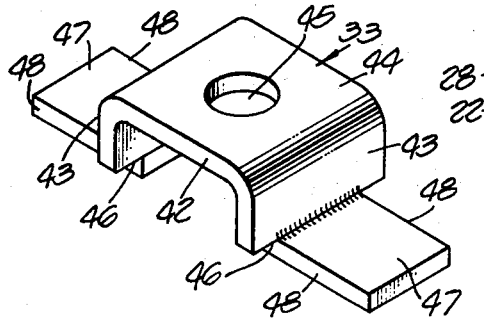
FIG. 1 is a front view of the rack.
Figure 3:
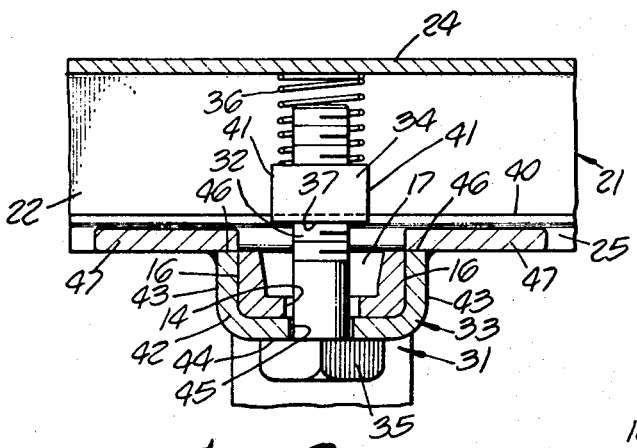
FIG. 3 is a cross-sectional view taken substantially on the lines 3—3 of FIG. 1 illustrating the means for locking the rack at a desired lateral position.

Referring now in detail to the drawings, the cable rack, generally designated 10, as stated before, is particularly useful in supporting underground electric cable 10a in concrete vaults, however, this invention is not intended to be limited to such use and other uses of the invention will become apparent from the following description of the invention. The cable rack 10 includes an elongated bracket 11 which extends along the wall 12 of the vault in a vertical position. The front 13 of the bracket 11 is provided with a central opening 14 at one end and a plurality of spaced apertures 15 extending the length thereof and the parallel sides 16 of the bracket 11 and the front 13 define a space 17 between the wall 12. The apertures 15 each include a downwardly extending slot 17a which is adapted to receive the narrow portion 18 of a rack arm 19 and thereby secure the rack arm 19 with the end 20 of the arm extending into the space 17. The rack arms 19 when secured extend outwardly from the wall 12 and are generally perpendicular thereto having a slight incline in order to better hold the cables.

The wall 12 of the vault is provided with a plurality of fixed supports, generally designated 21, each of which defines a continuous channel 22 extending horizontally along the wall 12. Each support 21 is embedded within the wall 12 and is constructed of steel and is generally C-shaped in cross-section. The channel 22 is defined by the sides 23 and the back 24 of the support 21 and the front 25 of the support 21 which includes a pair of flanges 26 and 27 which first project inwardly toward each other and then project rearwardly towards the back 24 to form a pair of parallel rails 28 and 29 which in turn define a horizontally extending opening 30 therebetween.

Figure 2:
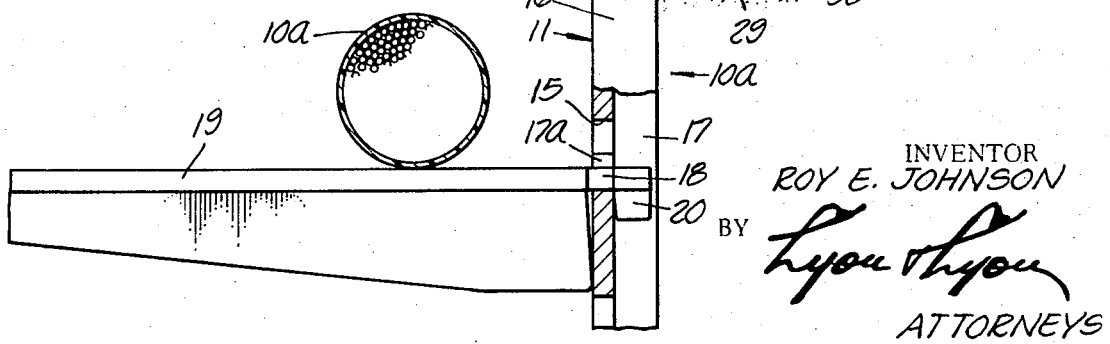
FIG. 2 is a cross-sectional view taken substantially on the lines 2—2 of FIG. 1 illustrating the means connecting the rack to the channel shaped support.

The bracket 11 is secured to the support 21 by a connector, generally designated 31, which includes screw threaded holding means 32 and brace means 33. The screw threaded holding means 32 comprises an internally threaded nut 34, a bolt 35 and a spring 36. The nut 34 is adapted to fit inside the channel 22, with the distance across the face 37 of the nut being greater than the distance across the opening 30. The spring 36 is secured to and projects from the opposite face 38 of the nut and is large enough in diameter to allow the stem of the bolt 35 to pass freely therethrough, as shown in FIG. 2. The spring 36 is compressed against the back 24 of the channel 22 when the nut 34 is in place and thereby biases the face 37 of the nut against the free ends 39 and 40 of the flanges 26 and 27, respectively. The bolt 35 extends through the opening 14 at the upper end of the bracket 11 and into the nut 34. The side corners 41 of the nut 34 prevent rotation of the nut 34 in the channel 22 as the bolt 35 is tightened. When the bolt 35 is tight, the nut is drawn up tightly against the free ends 39 and 40 of the flanges and prevents lateral movement of the rack 10. It is evident however that a lateral adjustment of the rack 10 is easily and quickly accomplished by merely loosening without disassembling the screw threaded holding means 32 and then sliding the rack 10 to the desired position.

However, even when the bolt 35 is sufficiently tight to prevent lateral movement of the rack 10 along the support 21, the nut 34 and bolt 35 will not prevent pivotal movement of the bracket 11 about the bolt 35 when a significant force, such as caused by the expansion and compression of the cable, is applied to the unsecured end of the bracket 11. The brace means 33 is adapted to prevent any such pivotal movement without interfering with the lateral adjustment of the rack 10. The brace means 33 is an integrally formed unit comprising a U-shaped body section or first section 42 corresponding in shape to the bracket 11 with the two sides 43 of the body section 42 adapted to fit over the sides 16 of the bracket 11 and the front 44 of the body section 42 adapted to extend across the front 13 of the bracket 11 and including a central opening 45. Extending from the end 46 of each side 43 is a flange 47. The identical flanges 47 comprise the second section of the brace means 33 and are rectantular in shape, with the width of each flange 47 being slightly less than the distance across the opening 30 and the side edges 48 of the flange 47 being sufficiently thick enough to protrude substantially beyond the end 46 of the side 43. When the connector 31 is assembled, the body section 42 of the brace means fits over the bracket 11 with the opening 45 in matched alignment with the opening 14 in the bracket, to permit passage of the bolt 35 therethrough into the channel 22. The flanges 47 fit into the opening 30 on each side of the body section 42 with the side edges 48 of each flange extending between the rails 28 and 29 as shown in FIG. 2. Thus, the rails 28 and 29 of the fixed support cooperate with the side edges 48 of the flanges or second section 47 during pivotal movement of the brace to substantially prevent any relative pivotal movement between the support and the second section 47 and the body section or first section of the brace prevents relative movement between the first section and the bracket 11, whereby the elongated bracket 11 is maintained in a fixed vertical position. However, the entire unit including the bracket, connector and brace can still be slid within the channel 22 for lateral adjustment of the rack by merely loosening the bolt.

The present invention provides a cable rack which is secured to a channel shaped support by a single bolt and when secured will not pivot and thereby be displaced. In addition, the rack is laterally adjustable and adjustment is accomplished by merely loosening the single bolt. The rack is relatively inexpensive to manufacture and includes existing components to further minimize costs.

Having fully described my invention, it is to be understood that I do not wish to be limited to the details herein set forth, but my invention is of the full scope of the appended claims.

I CLAIM:

1. A cable rack for use with a fixed support which defines a continuous open channel, comprising: an elongated bracket; a single connector for securing said bracket to the support, said connector including holding means and brace means; said holding means being adapted to permit lateral adjustment of said bracket along the channel and interconnecting said bracket, said brace means and the support; and said brace means including integral first and second sections, said first section preventing relative movement between said first section and said bracket and said second section preventing relative pivotal movement between second section and the support whereby said connector secures said bracket to the support, permits adjustment of said bracket and maintains said bracket in a fixed angular position relative to the support.

2. The rack of claim 1, wherein the channel opening is defined by a pair of parallel rails and said second section extends into the opening and cooperates with the parallel rails to prevent the relative pivotal movement between said second section and the support.

3. The rack of claim 2, wherein said second section comprises a pair of side flanges extending from each side of said first section and protruding into the channel opening.

4. The rack of claim 3, wherein said side flanges each include parallel side edges substantially adjacent said parallel rails and of sufficient length to cooperate with the parallel rails and thereby assist in guiding said bracket during a longitudinal adjustment.

5. The rack of claim 1, wherein said bracket and said first section of said brace means include aligned central openings and said holding means includes a bolt extending through said openings and cooperating with a nut in the channel whereby tightening of said bolt secures said bracket to the support and loosening of the bolt permits longitudinal adjustment of said bracket along the channel.

6. In combination, a fixed support having a laterally extending continuous open channel, an elongated bracket being adapted to support a plurality of rack arms, adjustable locking means for connecting one end of said bracket to the support and permitting lateral adjustment of said bracket along said channel, wherein the improvement comprises:

brace means secured to said bracket by said locking means and comprising an integral unit having a first section extending around said bracket and a second section extending into said channel, said second section being adapted to cooperate with said fixed support to prevent relative pivotal movement between said second section and said support and said first section being adapted to prevent relative movement between said first section and said bracket whereby said elongated bracket is maintained in a fixed perpendicular position with respect to said channel without interfering with the lateral adjustment of said bracket.

7. The device of claim 6, wherein said second section comprises a pair of flange members extending partially into and substantially across said channel on each side of said first section.

8. The device of claim 7, wherein said first section is U-shaped in cross-section and includes a central opening.

9. In a cable rack having an elongated bracket substantially rectangular C-shaped in cross-section with the front thereof including a plurality of longitudinally spaced apertures, each said aperture adapted to receive an arm for supporting cable thereon with said arm extending outwardly from said bracket and maintained substantially perpendicular thereto, a fixed support forming a continuous C-shaped channel and having a pair of parallel rails, said rails defining a continuous opening into said channel, a connector unit including a bolt, a nut, and biasing means, said bolt adapted to extend through one of said bracket apertures into said channel, said nut adapted to receive said bolt in said channel, and said biasing means acting on said nut and adapted to maintain said nut in a fixed position in said channel for reception of said bolt, in which the improvement comprises:

an integral brace member including a first section and a second section, said first section having a front face adapted to extend across the front of said bracket between the head of said bolt and said bracket and a pair of sides substantially perpendicular to said front face adapted to extend across the sides of said bracket and prevent relative angular movement between said bracket and said brace member, said front face having a center opening through which said bolt is adapted to extend, said second section comprising a pair of substantially rectangular flanges extending from the ends of said first section sides substantially parallel to said front face of said first section, said flanges adapted to extend into and across said channel opening between said rails, each said flange including a pair of parallel edges adapted to extend along said parallel rails and cooperate therewith to prevent relative angular movement between said brace member and said fixed support whereby said bracket is maintained in a fixed angular position with respect to said fixed support.

10. The cable rack of claim 9, wherein the width of said flanges between said parallel edges is less than the width of said sides and said front face of said first section in the direction in which said elongated bracket is adapted to extend.

11. The cable rack of claim 10, wherein the ends of said sides of said first section extend beyond said parallel edges of said flanges whereby said ends of said sides are adapted to abut the front of said parallel rails and thereby position said parallel edges adjacent said parallel rails.

* * * * *